Feb. 5, 1929.

J. R. O'CONNELL 1,701,213

FEED CHUCK

Filed March 24, 1925

Inventor
James R O'Connell

By Frank Keipes.
Attorney

Patented Feb. 5, 1929.

1,701,213

UNITED STATES PATENT OFFICE.

JAMES R. O'CONNELL, OF ROCHESTER, NEW YORK, ASSIGNOR OF ONE-HALF TO JOHN O. BENNETT, OF ROCHESTER, NEW YORK.

FEED CHUCK.

Application filed March 24, 1925. Serial No. 17,903.

The object of this invention is to provide improved gripping fingers and gripping jaws for feed chucks for use in screw machines for the purpose of feeding rod stock thru the spindle of a screw machine into the collet thereof.

These and other objects of this invention will be fully illustrated in the drawing, described in the specification and pointed out in the claims at the end thereof.

In the accompanying drawing.

In the several figures of the drawing like reference numerals indicate like parts.

The subject matter of this invention is an improvement on the feed chuck illustrated in my prior Patent No. 1,502,116 issued to me under date of July 22, 1924. This improvement of the feed chuck is provided to hold the gripping jaws in place in the feed chuck under the most severe conditions the chuck can be subjected to. This may be the case where the rod stock to be fed by the feed chuck has a burr on the end so that it will not readily enter between the gripping jaws. Ordinarily such a burr is removed and the end of the rod stock chamfered to center itself between the gripping jaws when it is forced into them. This practice, however, is not uniform and in some industries the end of the rod stock is not chamfered and a burr formed on the end is not taken off. In that case the rod stock will not readily center itself between the gripping jaws when forced between them, but on the other hand the shoulder formed by the burr will strike any obstruction formed by the gripping jaws and force the jaws out of place or dislocate them entirely if no provision is made to center the stock and prevent the burr from striking an obstruction within the feed chuck. In addition to this the gripping jaws must be held in place in the gripping finger so that they are not easily dislocated even if a severe blow from the rod stock hits them.

Figure 6:
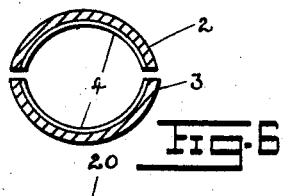
Figure 6 is a vertical cross section of the feed chuck, the section being taken on the line $6^x-6^x$ of Figure 3.
Figure 7:
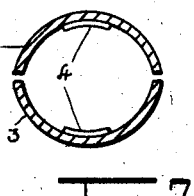
Figure 7 is a similar cross section showing a slight modification of the feed chuck.
Figure 8:
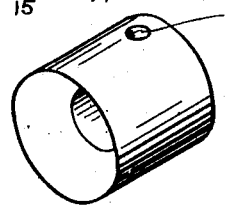
Figure 8 is a detail perspective view of one of the centering sleeves used in the feed chuck.
Figure 9:
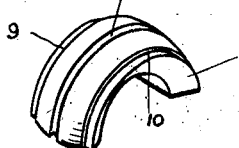
Figure 9 is a detail perspective view of one of the jaws of the feed chuck.

For this reason the concave channel 1 formed in the end of the gripping fingers 2 and 3 is supplemented by the shoulders 4 and 5 which may either be formed around the full length of the channel as illustrated in Figure 6 or be formed only for a short distance in the middle of each of the gripping fingers as illustrated in Figure 7. The gripping jaws 7 and 8 that are placed into the concave channel 1 are provided with corresponding shoulders 9 and 10 that engage the shoulders 4 and 5 and hold the jaws securely against endwise movement within the gripping fingers no matter how much pressure is exerted against them when the rod stock is fed between the gripping jaws.

Figure 1:
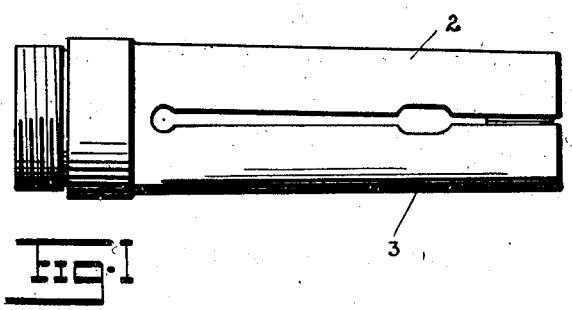
Figure 1 is a side elevation of the improved feed chuck.
Figure 2:
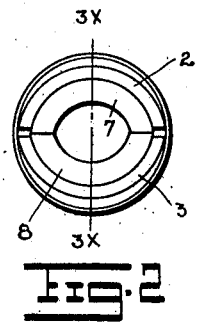
Figure 2 is a front elevation of the feed chuck.
Figure 3:
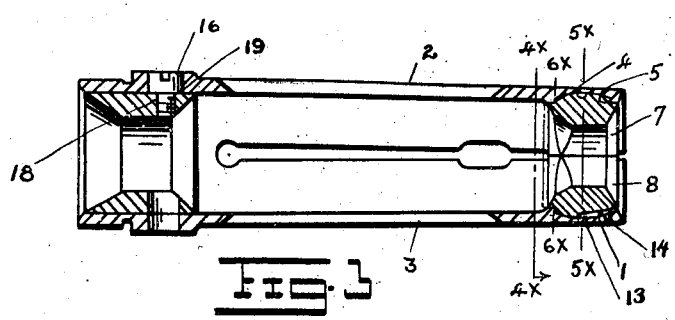
Figure 3 is a longitudinal sectional view of the feed chuck, the section being taken on the line $3^x-3^x$ of Figure 2.
Figure 4:
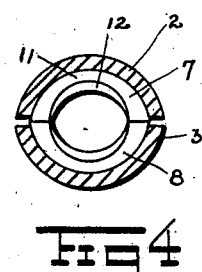
Figure 4 is a vertical cross section of the feed chuck, the section being taken on the line $4^x-4^x$ of Figure 3.

As illustrated in Figures 3 and 4, the jaws 7 and 8 are furthermore beveled on the inside with two bevels having different angles. One bevel 11 which starts from the inner edge of the jaws and is concentric with the jaws when they are expanded and another bevel 12 which starts at a suitable distance from the inner edge of the jaws and is circular in outline when the jaws are closed as illustrated in Figure 4. The first of these bevels 11 eliminates a possible shoulder that may be formed in the gripping fingers by the jaws and directs the rod stock toward the center of the jaws when it is forced against it. The second bevel 12 being circular in outline, centers the rod stock with relation to the closed jaws so that on further pressure by the rod stock equal pressure is exerted on both jaws that will open them to admit the rod stock between the jaws.

To locate one or both of the jaws in their proper position in the channel of the fingers of the feed chuck, a small groove 13 is cut from the front end to the middle of the jaw as illustrated at the right hand end of Figure 3. A pin 14 mounted in the channel of the finger is adapted to engage into the groove 13 and prevent the jaw from turning within the channel after it is once placed therein.

Figure 5:
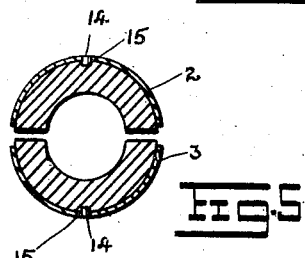
Figure 5 is a vertical cross section of the chuck, the section being taken on the line $5^x-5^x$ of Figure 3 showing the gripping jaws expanded for gripping purposes and showing a slight modification of the gripping jaws from those illustrated in Fig. 3.

Instead of the groove 13 a small pocket or depression 15 may be provided in the middle of perimeter of the jaws as illustrated in Figure 5 so that the pins 14 can engage into them and hold the jaws against rotation in the concave channel of the feed fingers.

At the left hand end the chuck is provided with the centering sleeve. The hole thru this sleeve is larger than that provided between the jaws 7 and 8 and is adapted to hold the stock somewhere near centrally of the chuck as it passes from one end of the feed chuck to the gripping jaws thereof. The centering sleeve is beveled at each end and is held in place in the chuck by means of the shoulder screw 16. The sleeve is inserted into the feed chuck and is located therein until the threaded hole 18 in the periphery of the sleeve registers with the hole 19 provided in the periphery of the feed chuck. The screw 16 is then placed into the hole 19 in the chuck and threaded into the hole 18 of the sleeve and thus locks the sleeve in a predetermined position in the chuck.

The jaws 7 and 8 are provided with a concentric groove 20 around the outside and at the middle thereof. This groove is provided so that when the jaws are taken out of the chuck and replaced by others they can be tied together by means of wire string or a spring that will hold them together and prevent the loss of one or the other until they are needed again for use in the chuck.

I claim:

1. In a feed chuck the combination of a pair of gripping fingers, a concave channel having a shoulder formed on each side thereof formed in the end of said gripping fingers, a pair of jaws having a stepped shoulder at the front and back thereof adapted to rest in said concave channel, a centering pin carried by said gripping fingers and projecting from said concave channel, said centering pin engaging said jaws and holding them against rotation in said concave channel.

2. A pair of jaws for feed chucks comprising semi-circular sections, each of said semi-circular sections being convex on the outside with a radius having its axis at right angles to the axis of said semi-circular sections and having a groove in the middle thereof.

3. In a feed chuck, the combination of a pair of gripping fingers formed integral at the end of a sleeve, a concave channel having a shoulder provided on one side thereof toward the end of said gripping fingers, a pair of jaws having a stepped shoulder at the front thereof adapted to nest into said concave shoulder and resting against said shoulder.

4. In a feed chuck, the combination of a pair of gripping fingers formed integral at the end of a sleeve, a concave channel having a shoulder provided on one side thereof toward the end of said gripping fingers, a pair of jaws having a stepped shoulder at the front thereof adapted to nest into said concave shoulder and resting against said shoulder, and means carried by said fingers to hold said jaws against rotation within said concave channel.

5. A feed collet comprising fingers, pads, a connection between said fingers and pads, said connection being formed by portions having a configuration which prevents longitudinal and turning movement of said pads relative to said fingers and permits radial shifting of said pads towards each other at opposite sides of the axis of said collet without said pads becoming disconnected from said fingers.

6. A feed collet made of tubular material that may be struck outwardly, said collet comprising interengaging fingers and pads, the engagement between said fingers and pads being in the form of contacting shoulders with some of said shoulders outstruck from said fingers.

7. A feed collet made of tubular material that may be struck inwardly, said collet comprising fingers, pads against the inner walls of said fingers and free to move inwardly towards each other, and means struck inwardly from said fingers to engage in said pads and prevent longitudinal or turning movement of said pads relative to said fingers.

8. A feed collet comprising resilient fingers, pads set against the inner walls of said fingers and free to move inwardly towards each other, and abrupt shouldered lugs preventing longitudinal displacement of said pads relative to said fingers.

9. A feed collet as called for in claim 8 wherein said lugs are radially disposed relative to the axis of said collet.

In testimony whereof I affix my signature.

JAMES R. O'CONNELL.